US012753312B2

(12) United States Patent
Hamajima

(10) Patent No.: US 12,753,312 B2
(45) Date of Patent: Oct. 6, 2026

(54) SILICONE EMULSION COMPOSITION AND FIBER TREATMENT AGENT

(71) Applicant: SHIN-ETSU CHEMICAL CO., LTD., Tokyo (JP)

(72) Inventor: Yuta Hamajima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 901 days.

(21) Appl. No.: 18/020,731

(22) PCT Filed: Aug. 3, 2021

(86) PCT No.: PCT/JP2021/028733

§ 371 (c)(1),
(2) Date: Feb. 10, 2023

(87) PCT Pub. No.: WO2022/034829

PCT Pub. Date: Feb. 17, 2022

(65) Prior Publication Data

US 2023/0295433 A1 Sep. 21, 2023

(30) Foreign Application Priority Data

Aug. 11, 2020 (JP) ................................ 2020-135585

(51) Int. Cl.

| | |
|---|---|
| ***C08L 83/08*** | (2006.01) |
| ***C08G 77/26*** | (2006.01) |
| ***C08G 77/46*** | (2006.01) |
| ***C08L 63/00*** | (2006.01) |
| ***D06M 13/11*** | (2006.01) |
| ***D06M 15/643*** | (2006.01) |
| ***D06M 15/647*** | (2006.01) |

(52) U.S. Cl.

CPC .............. *C08L 83/08* (2013.01); *C08G 77/26* (2013.01); *C08G 77/46* (2013.01); *C08L 63/00* (2013.01); *D06M 13/11* (2013.01); *D06M 15/643* (2013.01); *D06M 15/6436* (2013.01); *D06M 15/647* (2013.01)

(58) Field of Classification Search

CPC ......... C08L 83/08; C08L 63/00; C08G 77/26; C08G 77/46; D06M 15/647; D06M 15/643; D06M 15/6436; D06M 13/11

USPC .......................................................... 524/114

See application file for complete search history.

(56) References Cited

U.S. PATENT DOCUMENTS

| | | | |
|---|---|---|---|
| 5,807,956 | A | 9/1998 | Czech |
| 2003/0022982 | A1 | 1/2003 | Yu et al. |
| 2011/0052521 | A1 | 3/2011 | Tanaka et al. |
| 2014/0109795 | A1 | 4/2014 | Hirai |

FOREIGN PATENT DOCUMENTS

| | | | | |
|---|---|---|---|---|
| EP | 3816229 | A1 * | 5/2021 | .......... D06M 15/647 |
| JP | 10-168668 | A | 6/1998 | |
| JP | 2001172878 | A * | 6/2001 | |
| JP | 3199609 | B2 | 8/2001 | |
| JP | 2004-528412 | A | 9/2004 | |
| JP | 3859723 | B2 | 12/2006 | |
| JP | 2009-221450 | A | 10/2009 | |
| JP | 5743284 | B2 | 7/2015 | |
| JP | 2017-197863 | A | 11/2017 | |
| WO | WO 2020/003971 | A1 | 1/2020 | |

OTHER PUBLICATIONS

Extended European Search Report for European Application No. 21855908.6, dated Sep. 9, 2024.
International Search Report, issued in PCT/JP2021/028733, PCT/ISA/210, dated Oct. 5, 2021.
Written Opinion of the International Searching Authority, issued in PCT/JP2021/028733, PCT/ISA/237, dated Oct. 5, 2021.
Hattori et al., "Solid Acid Catalysis," Fudan University Press, 1st edition, May 2016, p. 267 (4 pages total), with English translation.
Qiyi et al., "Basic Organic Chemistry," Higher Education Press, vol. 1, 2nd edition, Nov. 1993, pp. 417-418 (5 pages total), with English translation.

* cited by examiner

*Primary Examiner* — Ruiyun Zhang

(74) *Attorney, Agent, or Firm* — Birch, Stewart, Kolasch & Birch, LLP

(57) ABSTRACT

A silicone emulsion composition with which the treated fiber surface exhibits flexibility and high water absorption and the treated fibers can maintain water absorption even after washing treatment that contains:

(A) an amino-modified silicone, represented by the average composition formula (1), that has a viscosity at 25° C. of 5-50,000 mPa·s and an amino group equivalent of 300-20,000 g/mol: 100 mass parts, (B) a specific polyoxyalkylene group-containing epoxy compound: 10-200 mass parts, (C) a surfactant: 1-70 mass parts, (D) an organic acid: 0.3-15 mass parts, and (E) water: 50 mass parts to 5,000 mass parts.

(1)

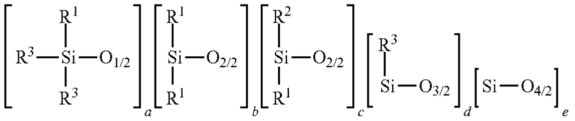

18 Claims, No Drawings

SILICONE EMULSION COMPOSITION AND FIBER TREATMENT AGENT

TECHNICAL FIELD

The present invention relates to a silicone emulsion composition. More specifically, the invention relates to a silicone emulsion composition which imparts a high water absorbency to textile fibers, and to a textile treatment agent containing this composition.

BACKGROUND ART

A variety of silicones, such as dimethylsilicones, epoxy-modified silicones and amino-modified silicones, have hitherto been widely used as treatment agents for imparting softness, smoothness and other desirable properties to various types of textile fibers and products.

Textile fibers treated with a treatment agent composed primarily of a silicone generally exhibit water repellency. Even textile fibers that are inherently water-absorbing exhibit hydrophobic properties following treatment with a silicone. When such a treatment agent is used in clothing, for instance, one drawback has been a substantial loss of the perspiration-absorbing action of the clothing during perspiration. This has led to studies aimed at imparting textile fibers with both softness and water absorbency. For example, the water absorbency is improved by including amino groups and polyoxyalkylene groups in the same silicone molecule. However, including polyoxyalkylene groups on the molecule greatly diminishes properties such as softness and smoothness. To resolve this drawback, art which modifies the aminoalkyl groups by reacting an amino-modified silicone with a polyoxyalkylene glycidyl ether compound has been described (JP Nos. 3199609 and 5743284: Patent Documents 1 and 2).

Textile products, especially articles of clothing, are commonly washed (laundered) after being worn, and then repeatedly used. In the prior art, use is made of the technique of imparting water absorbency to textile fibers by introducing hydrophilic groups onto the polymer molecule making up the treatment agent. However, because the polymer molecule in this approach has hydrophilic groups thereon, the active ingredient in the treatment agent ends up being removed by laundering. As a result, after laundering, the textile fibers lose their water absorbency.

Block copolymers in which silicone and polyoxyalkylene blocks alternate are also used in this field (JP No. 3859723 and JP-A 2004-528412: Patent Documents 3 and 4). Textile treatment agents are often used as aqueous dispersions or aqueous solutions, and so it is preferable for the ingredients making up the treatment agent to be suitable for use in an aqueous system. Block copolymers with alternating silicone and polyoxyalkylene blocks exhibit good softness and water absorbency in textile fibers, but the block copolymer by itself has a low water dispersibility. Therefore, when the block copolymer is to be used to treat textile fibers, it must first be diluted with a large amount of solvent, which poses problems in terms of the environment and safety. It is also possible for the block copolymer having alternating silicone and polyoxyalkylene blocks to be dispersed together with a surfactant in water and used as an emulsion. However, this approach calls for the additional step, following preparation of the block copolymer, of rendering the copolymer into an emulsion. Much time and cost is thus required to ultimately obtain the treatment agent, which is industrially undesirable.

Given the above background, there exists a desire for the development of a textile treatment agent which can impart softness and water absorbency to textile fibers and enables the fibers to maintain water absorbency even after laundering, and which moreover is suitable for use in an aqueous system.

PRIOR ART DOCUMENTS

Patent Documents

Patent Document 1: JP No. 3199609
Patent Document 2: JP No. 5743284
Patent Document 3: JP No. 3859723
Patent Document 4: JP-A 2004-528412

SUMMARY OF INVENTION

Technical Problem

In light of the above problems with the prior art, an object of this invention is to provide a silicone emulsion composition which enables the surfaces of textile fibers treated therewith to exhibit softness and high water absorbency and enables the treated fibers to maintain water absorbency even after laundering treatment. Another object is to provide a textile treatment agent which contains this composition.

Solution to Problem

The inventor has conducted intensive investigations aimed at achieving these objects and has found as a result that a silicone emulsion composition which includes components (A) to (E) below can impart softness and high water absorbency to textile fibers, and is also able to maintain the water absorbency of the fibers even after laundering. This discovery ultimately led to the present invention. In addition, because the inventive composition is a silicone emulsion, it can be used as a water-based textile treatment agent.

Accordingly, the present invention provides the following silicone emulsion composition and textile treatment agent.

1. A silicone emulsion composition which includes:

(A) 100 parts by weight of an amino-modified silicone of the following average empirical formula (1)

[Chem. 1]

(1)

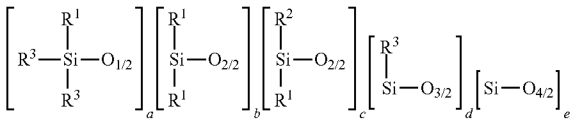

[wherein each $R^1$ is independently an unsubstituted monovalent hydrocarbon group of 1 to carbon atoms; each $R^2$ is independently a group of general formula (2)

$$—R^4—(NH—R^5)_f—NH_2 \quad (2)$$

(wherein $R^4$ and $R^5$ are each independently a divalent organic group of 1 to 6 carbon atoms, and f is 0 or 1); each $R^3$ is independently a group selected from the options for $R^1$ and $R^2$ or a group selected from —OH, —$OCH_3$ and —$OC_2H_5$; and the subscripts a, b, c, d and e are numbers which satisfy the conditions $2 \le a \le 10$, $5 \le b \le 800$, $0 \le c \le 50$, $0 \le d \le 5$ and $0 \le e \le 5$, with the proviso that if c=0, at least one occurrence of $R^3$ is $R^2$]

which has a viscosity at 25° C. of from 5 to 50,000 mPa·s and an amino equivalent weight of from 300 to 20,000 g/mol;

(B) from 10 to 200 parts by weight of a polyoxyalkylene group-containing epoxy compound of formula (2-1) or (2-2) below

[Chem. 2]

(2-1)

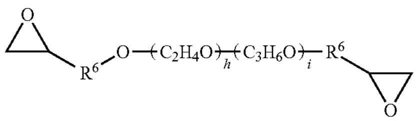

(2-2)

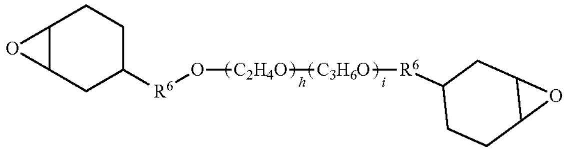

(wherein each $R^6$ is independently a divalent organic group, h is a number from 0 to 100, i is a number from 0 to 100, and h+i is a number from 1 to 100);

(C) from 1 to 70 parts by weight of a surfactant;

(D) from 0.3 to 15 parts by weight of an organic acid; and (E) from 50 to 5,000 parts by weight of water.

2. The silicone emulsion composition of 1 above, wherein component (A) is an amino-modified silicone of the following average empirical formula (1-2)

[Chem. 3]

(1-2)

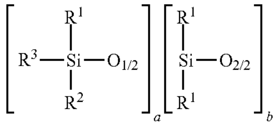

[wherein each $R^1$ is independently an unsubstituted monovalent hydrocarbon group of 1 to carbon atoms; each $R^2$ is independently a group of general formula (2)

$$—R^4—(NH—R^5)_f—NH_2 \qquad (2)$$

(wherein $R^4$ and $R^5$ are each independently a divalent organic group of 1 to 6 carbon atoms, and f is 0 or 1); each $R^3$ is independently a group selected from the options for $R^1$ and $R^2$, or is a group selected from —OH, —$OCH_3$ and —$OC_2H_5$; and the subscripts a and b are numbers which satisfy the conditions $2 \le a \le 10$ and $5 \le b \le 800$]

which has a viscosity at 25° C. of from 5 to 50,000 mPa·s and an amino equivalent weight of from 300 to 20,000 g/mol.

3. The silicone emulsion composition of 1 or 2 above, wherein component (B) is a polyoxyalkylene group-containing epoxy compound of formula (2-1) above.

4. The silicone emulsion composition of any of 1 to 3 above which further includes:

(F) from 1 to 50 parts by weight of a polyether-modified silicone of formula (4) below

[Chem. 4]

(4)

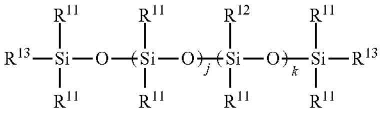

(wherein each $R^{11}$ is independently a phenyl group, an alkyl group of 1 to 6 carbon atoms, an alkoxy group of 1 to 6 carbon atoms or a hydroxyl group; each $R^{12}$ is independently a monovalent organic group of the formula —$C_\ell H_{2\ell}O(C_2H_4O)_m(C_3H_6O)_nR^{14}$; each $R^{13}$ is independently $R^{11}$ or $R^{12}$; $R^{14}$ is a hydrogen atom, an alkyl group of 1 to 6 carbon atoms or an acetyl group; j is a number from 0 to 100, k is a number from 0 to 100, j+k is a number from 0 to 200, $\ell$ is a number from 2 to 5, m is a number from 1 to 40 and n is a number from 0 to 40, with the proviso that if k=0, at least one occurrence of $R^{13}$ is $R^{12}$).

5. The silicone emulsion composition of any of 1 to 4 above which contains no organic solvent.

6. A textile treatment agent comprising the silicone emulsion composition of any of 1 to 5 above.

Advantageous Effects of Invention

Through this invention, there can be provided silicone emulsion compositions which impart softness and high water absorbency to the surfaces of textile fibers and which maintain the water absorbency of the fibers even after laundering. Textile treatment agents containing such compositions can also be thereby provided.

DESCRIPTION OF EMBODIMENTS

The invention is described in detail below.

[Component (A)]

Component (A) is an amino-modified silicone of the following average empirical formula (1)

[Chem. 5]

(1)

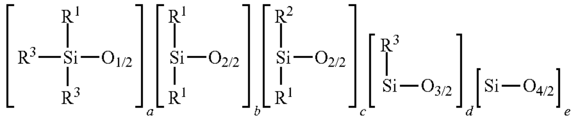

[wherein each $R^1$ is independently an unsubstituted monovalent hydrocarbon group of 1 to carbon atoms; each $R^2$ is independently a group of general formula (2)

$$—R^4—(NH—R^5)_f—NH_2 \qquad (2)$$

(wherein $R^4$ and $R^5$ are each independently a divalent organic group of 1 to 6 carbon atoms, and f is 0 or 1); each $R^3$ is independently a group selected from the options for $R^1$ and $R^2$ or a group selected from —OH, —$OCH_3$ and —$OC_2H_5$; and the subscripts a, b, c, d and e are numbers which satisfy the conditions 2≤a≤10, 5≤b≤800, 0≤c≤50, 0≤d≤5 and 0≤e≤5, with the proviso that if c=0, at least one occurrence of $R^3$ is $R^2$] which has a viscosity at 25° C. of from 5 to 50,000 mPa·s and an amino equivalent weight of from 300 to 20,000 g/mol. One such compound may be used alone or two or more may be used in combination.

Each $R^1$ is independently an unsubstituted monovalent hydrocarbon group of 1 to carbon atoms. Examples include alkyl groups such as methyl, ethyl, propyl, isopropyl, butyl, t-butyl, hexyl, cyclohexyl, heptyl, octyl, nonyl, decyl, tetradecyl and octadecyl groups; alkenyl groups such as vinyl, allyl, 5-hexenyl and oleyl groups; and aryl groups such as phenyl, tolyl and naphthyl groups. Of these, methyl groups, long-chain (6 to 20-carbon) alkyl groups, and phenyl groups are preferred. Methyl groups are more preferred.

Each $R^2$ is independently a group of general formula (2)

$$—R^4—(NH—R^5)_f—NH_2 \quad (2)$$

(wherein $R^4$ and $R^5$ are each independently a divalent organic group of 1 to 6 carbon atoms, and f is 0 or 1).

Exemplary divalent organic groups of 1 to 6 carbon atoms include divalent hydrocarbon groups such as alkylene, alkenylene and arylene groups. Examples of groups of general formula (2) include 2-aminoethyl, 3-aminopropyl, 6-aminohexyl, N-(2-aminoethyl)-3-aminopropyl, N-(3-aminopropyl)-3-aminopropyl and N-(2-aminoethyl)-6-aminohexyl groups. Of these, from the standpoint of, for example, the availability of the starting materials, a 3-aminopropyl group or (N-2-aminoethyl)-3-aminopropyl group is preferred.

Each $R^3$ is independently a group selected from the options for $R^1$ and $R^2$ or a group selected from —OH, —$OCH_3$ and —$OC_2H_5$; if c=0, $R^3$ is $R^2$. The subscript 'a' satisfies the condition 2≤a≤10, preferably 2≤a≤5, and is more preferably 2. When a is less than 2, the viscosity of the amino-modified silicone becomes too high and the emulsion stability worsens. On the other hand, when a is greater than 10, the viscosity of the amino-modified silicone becomes too low and the softness-imparting effect is low.

The subscript 'b' satisfies the condition 5≤b≤800, preferably 10≤b≤500, and more preferably 15≤b≤300. When b is less than 5, the viscosity of the amino-modified silicone becomes too low and the softness-imparting effect decreases. On the other hand, when b is greater than 800, the viscosity of the amino-modified silicone becomes too high and the softness-imparting effect worsens.

The subscript 'c' satisfies the condition 0≤c≤50, and is preferably from 1 to 30. When c is less than 1, the amount of amino groups in the amino-modified silicone may become too low and the emulsion stability may worsen. However, when $R^3$ is $R^2$, c may be less than 1 and may even be equal to 0. On the other hand, when c is greater than 50, the amount of amino groups on the amino-modified silicone is too high and yellowing of the treated fibers may occur.

The subscript 'd' satisfies the condition 0≤d≤5, and d is preferably 0. When d is greater than 5, the viscosity of the amino-modified silicone becomes too high and the emulsion stability worsens.

The subscript 'e' satisfies the condition 0≤e≤5, and e is preferably 0. When e is greater than 5, the viscosity of the amino-modified silicone becomes too high and the emulsion stability worsens.

Component (A) has a viscosity at 25° C. of from 5 to 50,000 mPa·s, preferably from 10 to 30,000 mPa·s, and more preferably from 20 to 20,000 mPa·s. At a viscosity below the above lower limit value, the softness-imparting effect becomes low. At a viscosity greater than the above upper limit value, the emulsion stability worsens. In this invention, the viscosity is a value measured with a BM-type rotational viscometer (available from, for example, Tokyo Keiki). The rotor is suitably selected from No. 1 to 4 rotors and the rotational velocity is suitably selected from a range of 6 to 60 rpm according to the viscosity.

Component (A) has an amino equivalent weight of from 300 to 20,000 g/mol, preferably from 400 to 15,000 g/mol, and more preferably from 500 to 13,000 g/mol. At an amino equivalent weight below the above lower limit value, the amino groups are too numerous, as a result of which yellowing of the treated fibers may occur. On the other hand, when the amino equivalent weight exceeds the above upper limit value, the amino groups are too scarce; the hydrophilicity that can be imparted as an amino-modified silicone is thus inadequate, as a result of which the emulsion stability worsens. As used herein, "amino equivalent weight" refers to the number of grams of amino-modified silicone that can be neutralized with one mole of hydrochloric acid, and is expressed theoretically as "molecular weight/number of nitrogen atoms." The amino equivalent weight can be measured by a neutralization titration method, such as with an automatic titrator from Hiranuma Co., Ltd.

Component (A) can be easily obtained by a known method of synthesis. For example, it can be obtained by an equilibration reaction between a cyclic siloxane such as octamethylcyclotetrasiloxane and a compound selected from 3-aminopropyldiethoxymethylsilane, N-(2-aminoethyl)-3-aminopropyldimethoxymethylsilane and hydrolyzates thereof, and other starting materials such as hexamethyldisiloxane in the presence of a catalyst such as an alkali metal hydroxide or tetramethylammonium hydroxide.

Component (A) is preferably an amino-modified silicone of the following average empirical formula (1-2)

[Chem. 6]

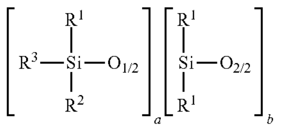

(1-2)

[wherein each $R^1$ is independently an unsubstituted monovalent hydrocarbon group of 1 to carbon atoms; each $R^2$ is independently a group of general formula (2)

$$—R^4—(NH—R^5)_f—NH_2 \quad (2)$$

(wherein $R^4$ and $R^5$ are each independently a divalent organic group of 1 to 6 carbon atoms, and f is 0 or 1); each $R^3$ is independently a group selected from the options for $R^1$ and $R^2$ or a group selected from —OH, —$OCH_3$ and —$OC_2H_5$; and the subscripts 'a' and 'b' are numbers which satisfy the conditions 2≤a≤10 and 5≤b≤800].

Specific examples of component (A) include those having the following formulas. The order of the siloxane bonds is not limited to those shown below.

[Chem. 7]

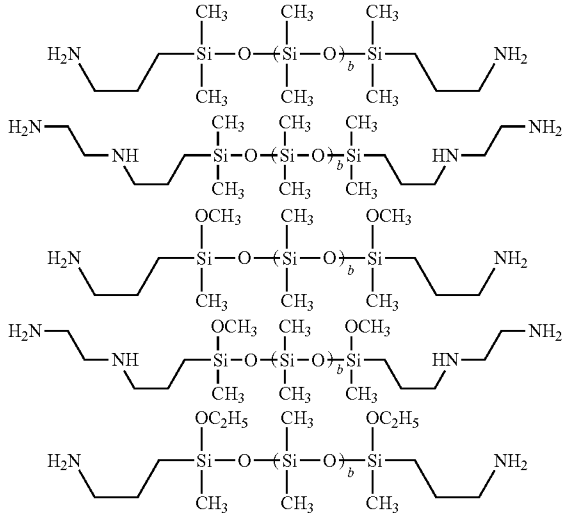

(wherein b and c are the same as above).

[Chem. 8]

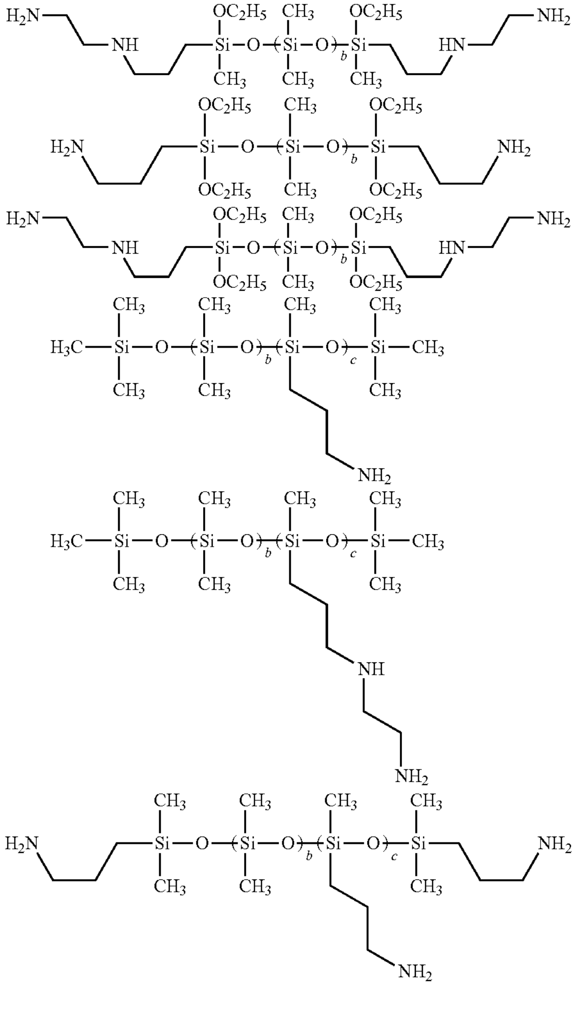

(wherein b and c are the same as above).

[Component (B)]

Component (B) is a polyoxyalkylene group-containing epoxy compound of formula (2-1) or (2-2) below

[Chem. 9]

(2-1)

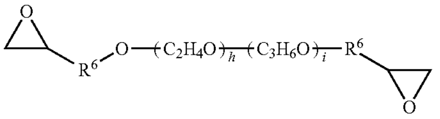

(2-2)

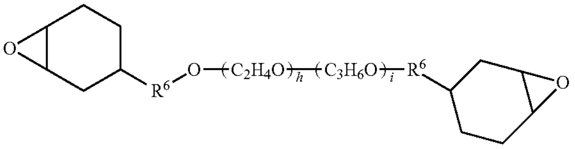

(wherein each $R^6$ is independently a divalent organic group, h is a number from 0 to 100, i is a number from 0 to 100, and h+i is a number from 1 to 100).

One such compound may be used alone or two or more may be used in combination. From the standpoint of availability, component (B) is preferably a compound of formula (2-1).

$R^6$ is a divalent organic group, preferably a divalent hydrocarbon group of 1 to 10 carbon atoms which may have an intervening oxygen atom, and more preferably a divalent hydrocarbon group of 1 to 6 carbon atoms which may have an intervening oxygen atom. Specific examples include alkylene groups such as methylene, ethylene, propylene (trimethylene, methylethylene), butylene (tetramethylene, methylpropylene), hexamethylene and octamethylene groups, arylene groups such as a phenylene group, combinations of two or more of these groups (alkylene/arylene groups, etc.), $—CH_2CH_2—O—CH_2CH_2—$, $—CH_2CH_2CH_2—O—CH_2—$ and $—CH(CH_3)CH_2—O—CH(CH_3)CH_2—$. Methylene, ethylene and trimethylene groups and also $—CH_2CH_2CH_2—O—CH_2—$ are especially preferred.

The subscript 'h' is a number from 0 to 100, the subscript T is a number from 0 to 100, and h+i is a number from 1 to 100. It is preferable for h to be a number from 1 to 70, for i to be a number from 0 to 50, and for h+i to be a number from 1 to 70. It is especially preferable for h to be a number from 3 to 50, for i to be a number from 0 to 30, and for h+i to be an integer from 3 to 50. When h+i is 0, the water dispersibility is low; when h+i is larger than 100, the softness-imparting effect on fibers is poor. Polyoxyalkylene groups of the formula $(C_2H_4O)_n(C_3H_6O)_i$ may have a block structure or a random structure.

Specific examples of the polyoxyalkylene group-containing epoxy compounds of formula (2-1) include, but are not limited to, the following:

[Chem. 10]

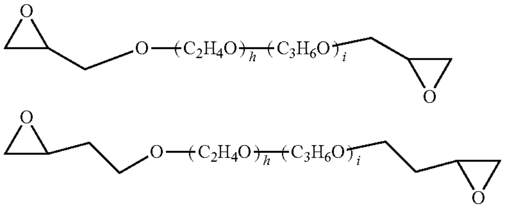

-continued

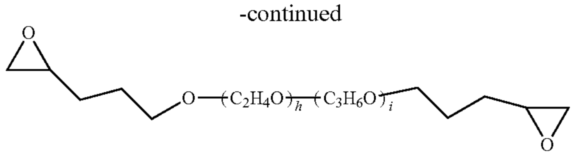

(wherein h and i are the same as above).

Specific examples of the polyoxyalkylene group-containing epoxy compounds of formula (2-2) include, but are not limited to, the following:

[Chem. 11]

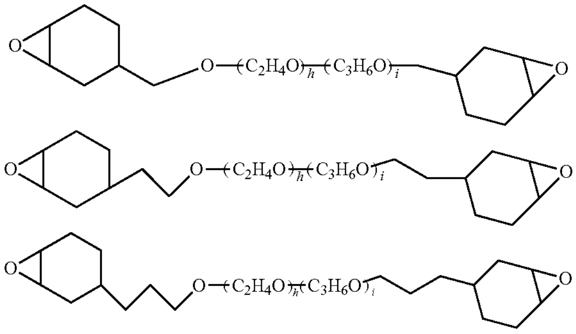

(wherein h and i are the same as above).

The content of component (B) per 100 parts by weight of component (A) is from 10 to 200 parts by weight, preferably from 20 to 150 parts by weight, and more preferably from 25 to 100 parts by weight.

[Component (C)]

The surfactant serving as component (C) is exemplified by, without particular limitation, nonionic surfactants, anionic surfactants, cationic surfactants and amphoteric surfactants. One of these may be used alone or two or more may be used in suitable combination.

Exemplary nonionic surfactants include polyoxyalkylene alkyl ethers such as polyoxyethylene alkyl ethers and polyoxyethylene-propylene alkyl ethers, polyoxyethylene fatty acid esters and polyoxyethylene sorbitan fatty acid esters. Examples of polyoxyethylene alkyl ethers include polyoxyethylene octyl ether, polyoxyethylene nonyl ether, polyoxyethylene decyl ether, polyoxyethylene cetyl ether, polyoxyethylene stearyl ether and polyoxyethylene oleyl ether. Examples of polyoxyethylene-propylene alkyl ethers include polyoxyethylene-propylene decyl ether, polyoxyethylene-propylene lauryl ether and polyoxyethylene-propylene tridecyl ether. Of these, polyoxyalkylene alkyl ethers are preferred; polyoxyethylene alkyl ethers and polyoxyethylene-propylene alkyl ethers are more preferred.

Exemplary anionic surfactants include alkyl sulfates of general formula (6) below and alkylbenzene sulfonates of general formula (7) below.

$$R^7—OSO_3M \quad (6)$$

$$R^7—C_6H_4—OSO_3M \quad (7)$$

(wherein $R^7$ is a linear or branched alkyl group of 8 to 30 carbon atoms, preferably 8 to 12 carbon atoms; and M is a hydrogen atom or a metal element, and is preferably a hydrogen atom, an alkali metal element or an alkaline earth metal element).

An exemplary alkyl sulfate is sodium lauryl sulfate. Examples of alkyl benzene sulfonates include salts of hexyl benzene sulfonic acid, octyl benzene sulfonic acid, decyl benzene sulfonic acid, dodecyl benzene sulfonic acid, cetyl benzene sulfonic acid and myristyl benzene sulfonic acid.

Exemplary anionic surfactants include higher fatty acids such as lauric acid, stearic acid, oleic acid and linolenic acid as well as salts thereof, polyoxyethylene monoalkyl ether sulfuric acids and salts thereof of general formula (8) below, polyoxyethylene alkyl phenyl ether sulfuric acid ester salts of general formula (9) below, and alkyl ether carboxylic acids and salts thereof of formula (10) below.

$$R^8O(EO)_x(PO)_ySO_3M \quad (8)$$

$$R^8—C_6H_4—O(EO)_x(PO)_ySO_3M \quad (9)$$

$$R^8—O(EO)_x(PO)_y—COOM \quad (10)$$

In these formulas, $R^8$ is a linear or branched alkyl group of 3 to 30 carbon atoms, M is a hydrogen atom or a metal element, x and y are each from 0 to 30, and x+y is from 1 to 30. Also, EO represents a polyoxyethylene group, and PO represents a polyoxypropylene group.

Exemplary cationic surfactants include quaternary ammonium salts and alkylamine acetates. Exemplary anionic surfactants include alkyl sulfates, alkyl benzene sulfonates, alkyl sulfosuccinates, polyoxyethylene alkyl ether sulfates and polyoxyethylene alkyl phenyl ether sulfates.

Exemplary amphoteric surfactants include alkyl betaines and alkyl imidazolines.

The content of component (C) per 100 parts by weight of component (A) is from 1 to 70 parts by weight, preferably from 5 to 60 parts by weight, and more preferably from 10 to 50 parts by weight.

[Component (D)]

Component (D) is an organic acid. One organic acid may be used alone or two or more may be used in suitable combination. Exemplary organic acids include monocarboxylic acids, dicarboxylic acids, hydroxycarboxylic acids, aromatic carboxylic acids and acidic amino acids. Specific examples include monocarboxylic acids such as formic acid, acetic acid, propionic acid and caprylic acid; dicarboxylic acids such as malonic acid, succinic acid, glutaric acid, adipic acid, maleic acid and fumaric acid; hydroxycarboxylic acids such as glycolic acid, lactic acid, hydroxyacrylic acid, glyceric acid, malic acid, tartaric acid and citric acid; aromatic carboxylic acids selected from benzoic acid, salicylic acid and phthalic acid; and acidic amino acids such as glutamic acid and aspartic acid.

The content of component (D) per 100 parts by weight of component (A) is from 0.3 to 15 parts by weight, preferably from 0.4 to 12 parts by weight, and more preferably from 0.5 to 10 parts by weight. When the amount of component (D) is too small, the emulsion stability may decrease; when it is too large, the treated fibers may yellow.

[Component (E)]

Water is included as component (E) in the silicone emulsion composition of the invention. All types of water, such as deionized water or purified water, may be used as component (E). The water content per 100 parts by weight of component (A) is from 50 to 5,000 parts by weight, and preferably from 100 to 2,000 parts by weight.

The inventor's thinking on the working effects of this invention is as follows. The amino-modified silicone serving as component (A) is known to have an excellent softness-imparting effect on textile fibers. However, component (A) by itself cannot impart water absorbency to the fibers. On the other hand, the polyoxyalkylene group-containing epoxy compound serving as component (B) is able to impart water absorbency to textile fibers on account of the high hydrophilicity of the polyoxyalkylene groups on the molecule, but is readily removed by laundering. This invention relates to a silicone emulsion that includes both component (A) and component (B). When a textile treatment agent is used, after a fabric has been treated with the treatment agent, the treated fabric generally passes through a heating step. During this heating treatment, it is thought that the amino groups present on component (A) react with the epoxy groups present on component (B) to form a high-molecular-weight polymer. Due to the formation of such a high-molecular-weight polymer at the time of fiber heat treatment, removal of the textile treatment agent by laundering is less likely to occur, enabling the fibers to retain a high water absorbency even after laundering. Moreover, it is possible for the amino groups of component (A) and the epoxy groups of component (B) to react with reactive functional groups present on the fibers, and so it appears to be possible for the water absorbency from component (B) to be retained even after laundering.

When a high-molecular-weight polymer is produced ahead of time, the subsequent emulsification and textile treatment steps are complicated. However, the present invention provides a composition based on the novel concept of, instead of reacting components (A) and (B) beforehand, preparing an emulsion that includes each of these components and rendering it into a high-molecular-weight polymer at the time of fiber treatment, thus giving a water-based textile treatment agent which has excellent properties and is easy to use.

[Component (F)]

To increase the water absorbency, in addition to above components (A) to (E), it is desirable for the silicone emulsion composition of the invention to include also (F) a polyester-modified silicone of formula (4) below. Component (F) may be one such silicone used alone or two or more may be used in suitable combination.

[Chem. 12]

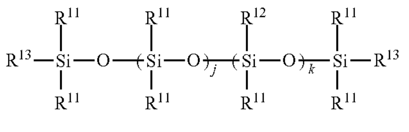

(4)

In the formula, each $R^{11}$ is independently a phenyl group, an alkyl group of 1 to 6 carbon atoms, an alkoxy group of 1 to 6 carbon atoms or a hydroxyl group; each $R^{12}$ is independently a monovalent organic group of the formula $—C_lH_{2l}O(C_2H_4O)_m(C_3H_6O)_nR^{14}$; each $R^{13}$ is independently RH or $R^{12}$; $R^{14}$ is a hydrogen atom, an alkyl group of 1 to 6 carbon atoms or an acetyl group; j is a number from 0 to 100, k is a number from 0 to 100, j+k is a number from 0 to 200, l is a number from 2 to 5, m is a number from 1 to 40, and n is a number from 0 to 40. When k=0, at least one occurrence of $R^{13}$ is $R^{12}$.

In formula (4), each RH is independently a phenyl group, an alkyl group of 1 to 6 carbon atoms, an alkoxy group of 1 to 6 carbon atoms or a hydroxyl group. Specific examples of RH include alkyl groups such as methyl, ethyl, propyl, butyl, pentyl and hexyl groups; the phenyl group; alkoxy groups such as methoxy, ethoxy, propoxy, butoxy and hexyloxy groups; and the hydroxyl group. Methyl, ethyl, phenyl, methoxy and ethoxy groups are preferred.

In above formula (4), each $R^{12}$ is independently a monovalent organic group of the formula $—C_lH_{2l}O(C_2H_4O)_m(C_3H_6O)_nR^{14}$. Here, $R^{14}$ is a hydrogen atom, an alkyl group of 1 to 6 carbon atoms or an acetyl group. Specific examples of $R^{14}$ include a hydrogen atom, alkyl groups such as methyl, ethyl, propyl, butyl and pentyl groups, and the acetyl group. Also, l is a number from 2 to 5, preferably a number from 2 to 4; m is a number from 1 to 40, preferably a number from 1 to 20; and n is a number from 0 to 40, preferably a number from 0 to 20.

In formula (4), j is a number from 0 to 100, preferably from 0 to 50, more preferably from 1 to 50, and even more preferably from 1 to 30; k is a number from 0 to 100, preferably from 1 to 50, and more preferably from 1 to 30; and j+k is a number from 0 to 200, preferably from 1 to 100, and more preferably from 1 to 60.

In formula (4), when k=0, at least one occurrence of $R^{13}$ is $R^{12}$. Also, in the present invention, there are preferably from 1 to 10, especially from 1 to 5, occurrences of $R^{12}$ in formula (4).

Specific examples of component (F) include those shown below.

[Chem. 13]

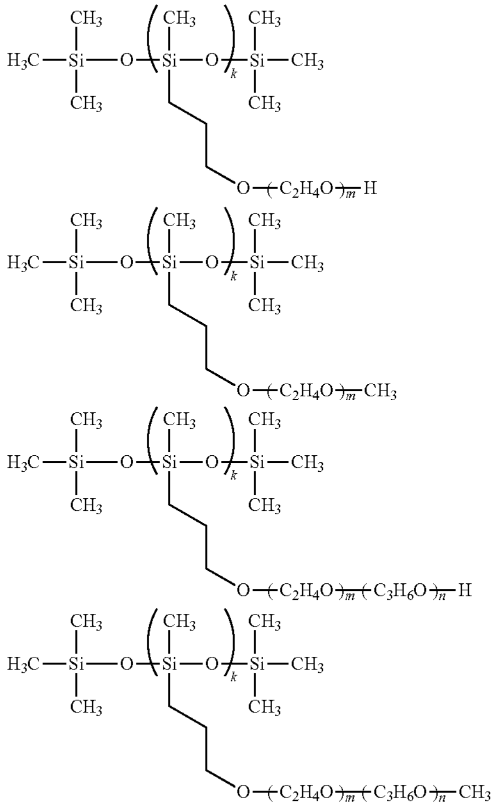

-continued

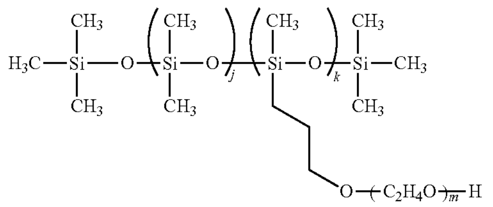

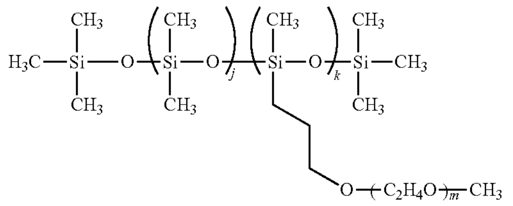

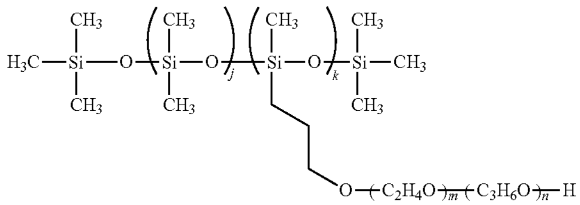

[Chem. 14]

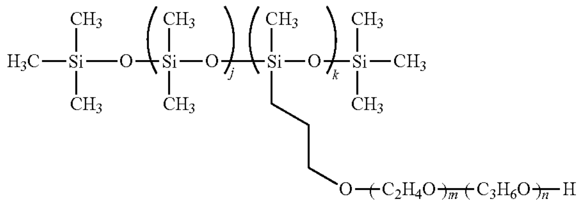

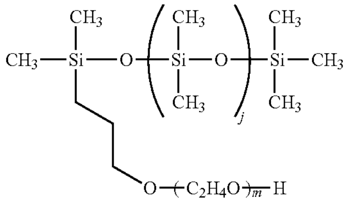

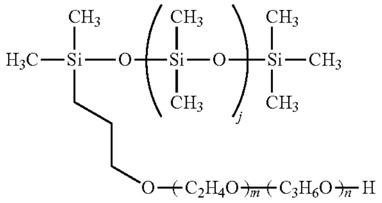

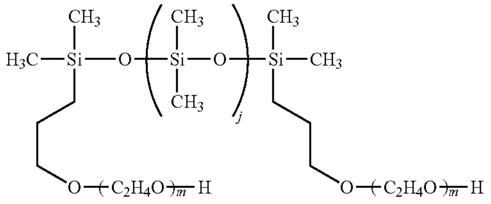

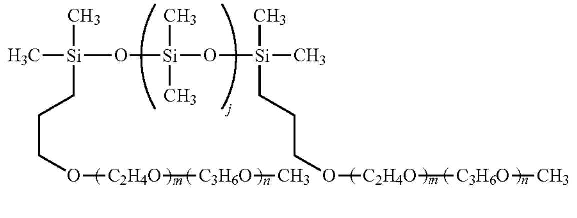

-continued

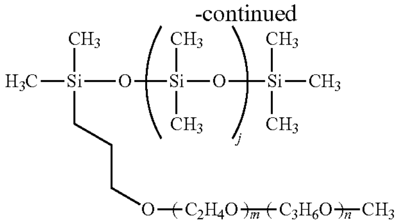

[Chem. 15]

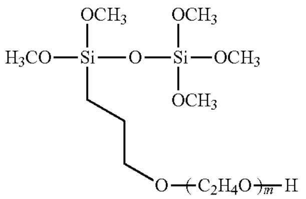

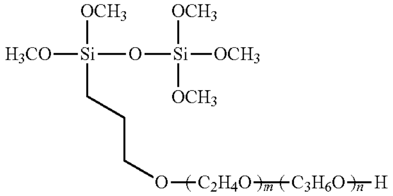

(wherein j, k, m and n are the same as above).

When component (F) is included, the content thereof per 100 parts by weight of component (A) is from 1 to 50 parts by weight, preferably from 5 to 45 parts by weight, and more preferably from 10 to 40 parts by weight.

It is possible to not include organic solvents such as toluene, xylene or isododecane in the silicone emulsion composition of the invention. From the standpoint of the environmental impact, it is preferable for the composition to be free of organic solvents.

[Optional Ingredients]

In addition to above components (A) to (F), where necessary, suitable amounts of various optional ingredients may be included in the silicone emulsion composition of the invention within ranges that do not detract from the objects of the invention. For example, various thickeners, pigments, dyes, penetrants, antistatic agents, antifoaming agents, flame retardants, antimicrobial agents, preservatives, water repellents, crosslinking agents, adhesion promoters, as well as other silicone oils, silicone resins, acrylic resins and urethane resins may be suitably included as such optional ingredients. The silicone emulsion composition of the invention may be used to treat various types of substrate surfaces, including textile, paper, metal, wood, rubber, plastic and glass. Various known coating methods such as dipping, spraying, roll coating, bar coating and brushing may be used as the method of application onto substrates.

[Method of Production]

The method of preparing the inventive silicone emulsion composition should be in keeping with known methods. For example, preparation may be carried out by mixing together components (A) to (E) and using an emulsifier. The emulsifier is not particularly limited. Use can be made of, for example, a homogenizing mixer, a homogenizer, a colloid mill, a universal mixer, a Combi Mix or a line mixer. The emulsion may be diluted by the further addition of water, and the resulting dilution used in the subsequently described application. The amount of water used for dilution is not particularly limited, and may be suitably adjusted according to the intended application.

[Textile Treatment Agent]

The silicone emulsion composition of the invention may be used in, for example, textile treatment agents (e.g., hand builders), binders for inorganic or organic substances (e.g., binders for optical catalysts and other functional inorganic fillers), paints and coatings, mold release agents, backside treatment agents for pressure-sensitive adhesive sheets, surface coating agents for various types of substrates, and agents for imparting release properties or slip characteristics to the surfaces of rubber articles. Of these, because treated fiber surfaces have an excellent water absorbency, the silicone emulsion composition of the invention is useful as a textile treatment agent.

The silicone emulsion composition may be used directly as a textile treatment agent or may be suitably included in a textile treatment agent within a range of from, for example, 0.01 to 99 wt %. In cases where textile fibers are to be treated, the textile treatment agent may be diluted and used, the content of the silicone emulsion composition within the textile treatment agent dilution for treating textile fibers, expressed as the solids content, being preferably from 0.01 to 5 wt %, and more preferably from 0.1 to 1 wt %.

The textile treatment agent of the invention is effective on all of the following: natural fibers such as cotton, silk, linen, wool, angora and mohair; synthetic fibers such as polyester, nylon, acrylics and spandex; and also textile products in which these are used. Nor are there any limitations as to the form and shape of such textile fibers and products, the textile treatment agent of the invention being suitable for use in treating not only raw material shapes such as staple fiber, filament, tow and yarn, but also various processed forms such as knit fabric, woven fabric, batting, nonwoven fabric, paper, sheet and film.

[Method of Use]

The method for using the silicone emulsion composition and the textile treatment agent preferably involves impregnating the textile to be treated with from 0.01 to 5 wt % (solids) of the treatment liquid, followed by heat treatment at 90 to 170° C.

EXAMPLES

The invention is described more fully below by way of Examples and Comparative Examples, although these Examples do not limit the invention. In the following Examples, unless noted otherwise, "%" in the compositions indicates percent by weight.

The following commercial products were used in the Examples.

(C) Surfactants (C-1) Emulgen 1108 (trade name): polyoxyethylene alkyl ether, available from Kao Chemicals; hydrophilic-lipophilic balance (HLB), 13.5

(C-2) Newcol 1310 (trade name): polyoxyethylene tridecyl ether, available from Nippon Nyukazai Co., Ltd.; HLB, 13.7

The amount given for ingredients indicated by their trade names is the amount of product used, this being 100% active ingredient for both (C-1) and (C-2).

Example 1

An amino-modified silicone emulsion composition (I-1) was obtained by using a homogenizing mixer to mix together, emulsify and disperse the following:

(A-1) 100.00 parts by weight of the amino-modified silicone of formula (a1) below

[Chem. 16]

(a1)

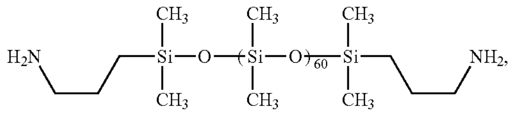

(B-2) 48.48 parts by weight of the polyoxyalkylene group-containing epoxy compound of formula (b1) below,

[Chem. 17]

(b1)

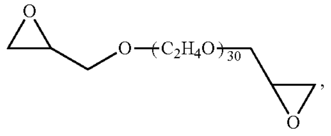

(C-1) 24.77 parts by weight of Emulgen 1108, (D-1) 8.19 parts by weight of lactic acid, and (E) 321.74 parts by weight of deionized water.

Example 2

An amino-modified silicone emulsion composition (I-2) was obtained by using a homogenizing mixer to mix together, emulsify and disperse the following:

(A-2) 100.00 parts by weight of the amino-modified silicone of formula (a2) below

[Chem. 18]

(a2)

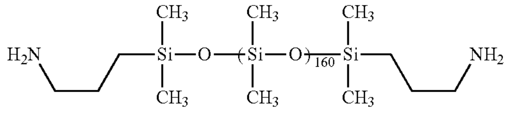

(B-2) 29.12 parts by weight of a polyoxyalkylene group-containing epoxy compound of formula (b1) above, (C-2) 21.51 parts by weight of Newcol 1310, (D-1) 3.29 parts by weight of lactic acid, and (E) 279.71 parts by weight of deionized water.

Example 3

An amino-modified silicone emulsion composition (I-3) was obtained by using a homogenizing mixer to mix together, emulsify and disperse the following:

(A-2) 100.00 parts by weight of the amino-modified silicone of formula (a2) above, (B-2) 19.41 parts by weight of the polyoxyalkylene group-containing epoxy compound of formula (b1) above, (C-1) 19.89 parts by weight of Emulgen 1108, (D-1) 1.62 parts by weight of lactic acid, and (E) 258.66 parts by weight of deionized water.

Example 4

An amino-modified silicone emulsion composition (I-4) was obtained by using a homogenizing mixer to mix together, emulsify and disperse the following:

(A-1) 100.00 parts by weight of the amino-modified silicone of formula (a1) above, (B-1) 51.65 parts by weight of the polyoxyalkylene group-containing epoxy compound of formula (b2) below

[Chem. 19]

(b2)

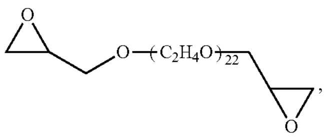

(C-1) 25.34 parts by weight of Emulgen 1108, (D-1) 8.17 parts by weight of lactic acid, and (E) 328.48 parts by weight of deionized water.

Example 5

An amino-modified silicone emulsion composition (I-5) was obtained by using a homogenizing mixer to mix together, emulsify and disperse the following:

(A-1) 100.00 parts by weight of the amino-modified silicone of formula (a1) above, (B-1) 38.74 parts by weight of the polyoxyalkylene group-containing epoxy compound of formula (b2) above, (C-2) 23.13 parts by weight of Newcol 1310, (D-1) 8.17 parts by weight of lactic acid, and (E) 300.66 parts by weight of deionized water.

Example 6

An amino-modified silicone emulsion composition (I-6) was obtained by using a homogenizing mixer to mix together, emulsify and disperse the following:

(A-1) 100.00 parts by weight of the amino-modified silicone of formula (a1) above, (B-1) 51.66 parts by weight of the polyoxyalkylene group-containing epoxy compound of formula (b2) above, (C-2) 25.27 parts by weight of Newcol 1310, (D-1) 3.08 parts by weight of lactic acid, and (E) 328.59 parts by weight of deionized water.

Example 7

An amino-modified silicone emulsion composition (I-7) was obtained by using a homogenizing mixer to mix together, emulsify and disperse the following:

(A-2) 100.00 parts by weight of the amino-modified silicone of formula (a2) above, (B-1) 20.63 parts by weight of the polyoxyalkylene group-containing epoxy compound of formula (b2) above, (C-2) 20.11 parts by weight of Newcol 1310, (D-1) 3.26 parts by weight of lactic acid, and (E) 261.38 parts by weight of deionized water.

Example 8

An amino-modified silicone emulsion composition (I-8) was obtained by using a homogenizing mixer to mix together, emulsify and disperse the following:

(A-3) 100.00 parts by weight of the amino-modified silicone of formula (a3) below

[Chem. 20]

(a3)

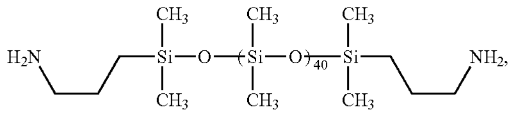

(B-1) 77.29 parts by weight of the polyoxyalkylene group-containing epoxy compound of formula (b2) above, (C-2) 29.53 parts by weight of Newcol 1310, (D-1) 4.57 parts by weight of lactic acid, and (E) 384.04 parts by weight of deionized water.

Example 9

An amino-modified silicone emulsion composition (I-9) was obtained by using a homogenizing mixer to mix together, emulsify and disperse the following:

(A-1) 100.00 parts by weight of the amino-modified silicone of formula (a1) above, (B-3) 24.36 parts by weight of the polyoxyalkylene group-containing epoxy compound of formula (b3) below

[Chem. 21]

(b3)

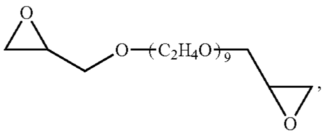

(C-2) 20.71 parts by weight of Newcol 1310, (D-1) 3.06 parts by weight of lactic acid, and (E) 269.52 parts by weight of deionized water.

Example 10

An amino-modified silicone emulsion composition (I-10) was obtained by using a homogenizing mixer to mix together, emulsify and disperse the following:

(A-1) 100.00 parts by weight of the amino-modified silicone of formula (a1) above, (B-1) 43.59 parts by weight of the polyoxyalkylene group-containing epoxy compound of formula (b2) above, (C-2) 21.32 parts by weight of Newcol 1310, (D-2) 2.32 parts by weight of acetic acid, and (E) 276.53 parts by weight of deionized water.

Example 11

An amino-modified silicone emulsion composition (I-11) was obtained by using a homogenizing mixer to mix together, emulsify and disperse the following:

(A-2) 100.00 parts by weight of the amino-modified silicone of formula (a2) above, (B-1) 20.66 parts by weight of the polyoxyalkylene group-containing epoxy compound of formula (b2) above, (C-2) 20.17 parts by weight of Newcol 1310, (D-2) 3.29 parts by weight of acetic acid, and (E) 262.22 parts by weight of deionized water.

Example 12

An amino-modified silicone emulsion composition (I-12) was obtained by using a homogenizing mixer to mix together, emulsify and disperse the following:

(A-1) 100.00 parts by weight of the amino-modified silicone of formula (a1) above, (B-1) 51.60 parts by weight of the polyoxyalkylene group-containing epoxy compound of formula (b2) above, (C-2) 25.25 parts by weight of Newcol 1310, (D-1) 3.08 parts by weight of lactic acid, (E) 328.46 parts by weight of deionized water, and (F-1) 16.31 parts by weight of the polyether-modified silicone of formula (f1) below

[Chem. 22]

(f1)

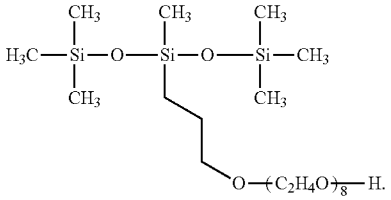

Example 13

An amino-modified silicone emulsion composition (I-13) was obtained by using a homogenizing mixer to mix together, emulsify and disperse the following:

(A-2) 100.00 parts by weight of the amino-modified silicone of formula (a2) above, (B-1) 20.68 parts by weight of the polyoxyalkylene group-containing epoxy compound of formula (b2) above, (C-2) 20.12 parts by weight of Newcol 1310, (D-1) 1.24 parts by weight of lactic acid, (E) 261.48 parts by weight of deionized water, and (F-1) 24.20 parts by weight of the polyether-modified silicone of formula (f1) above.

Example 14

An amino-modified silicone emulsion composition (I-14) was obtained by using a homogenizing mixer to mix together, emulsify and disperse the following:

(A-2) 100.00 parts by weight of the amino-modified silicone of formula (a2) above, (B-1) 20.68 parts by weight of the polyoxyalkylene group-containing epoxy compound of formula (b2) above, (C-2) 20.12 parts by weight of Newcol 1310, (D-1) 1.24 parts by weight of lactic acid, (E) 261.48 parts by weight of deionized water, and (F-2) 24.20 parts by weight of the polyether-modified silicone of formula (f2) below

[Chem. 23]

(f2)

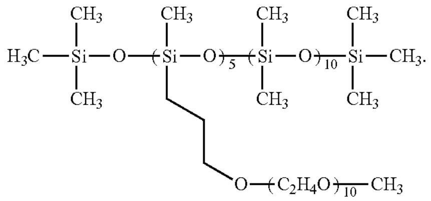

Comparative Example 1

An amino-modified silicone emulsion composition (II-1) was obtained by using a homogenizing mixer to mix together, emulsify and disperse the following:

(A-1) 100.00 parts by weight of the amino-modified silicone of formula (a1) above, (C-2) 20.00 parts by weight of Newcol 1310, (D-1) 2.00 parts by weight of lactic acid, and (E) 300.00 parts by weight of deionized water.

Comparative Example 2

An aqueous dispersion (II-2) of a polyoxyalkylene group-containing epoxy compound was obtained by using a homogenizing mixer to mix together, emulsify and disperse the following:

(B-1) 100.00 parts by weight of the polyoxyalkylene group-containing epoxy compound of formula (b2) above, (C-2) 20.00 parts by weight of Newcol 1310, (D-1) 2.00 parts by weight of lactic acid, and (E) 300.00 parts by weight of deionized water.

Comparative Example 3

An amino-modified silicone emulsion composition (II-3) was obtained by using a homogenizing mixer to mix together, emulsify and disperse the following:

(A-1) 100.00 parts by weight of the amino-modified silicone of formula (a1) above, (C-2) 20.00 parts by weight of Newcol 1310, (D-1) 2.00 parts by weight of lactic acid, (E) 300.00 parts by weight of deionized water, and (F-1) 20.00 parts by weight of the polyether-modified silicone of formula (f1) above.

Comparative Example 4

An amino-modified silicone emulsion composition (II-4) was obtained by using a homogenizing mixer to mix together, emulsify and disperse the following:

(A-1) 100.00 parts by weight of the amino-modified silicone of formula (a1) above,
(B-1) 3.00 parts by weight of the polyoxyalkylene group-containing epoxy compound of formula (b2) above,
(C-2) 20.00 parts by weight of Newcol 1310,
(D-1) 2.00 parts by weight of lactic acid, and
(E) 300.00 parts by weight of deionized water.

Comparative Example 5

An amino-modified silicone emulsion composition (II-5) was obtained by using a homogenizing mixer to mix together, emulsify and disperse the following:
(A-1) 100.00 parts by weight of the amino-modified silicone of formula (a1) above,
(B-1) 600.00 parts by weight of the polyoxyalkylene group-containing epoxy compound of formula (b2) above,
(C-2) 20.00 parts by weight of Newcol 1310,
(D-1) 2.00 parts by weight of lactic acid, and
(E) 500.00 parts by weight of deionized water.

The evaluation tests shown below were performed on the emulsion compositions obtained in the above Examples and Comparative Examples. The formulations and results are shown in the tables below.

[Evaluation Tests]

1. Softness

Test liquors were prepared by adding deionized water to the emulsion composition and diluting it to a solids content of 2%. A polyester/cotton broadcloth (65%/35%, from Tanigashira Shoten) was dipped for 1 minute in the test liquor, following which a roller was used to squeeze the cloth to a percent expression of 100%, and the cloth was heat-treated for 2 minutes at 150° C., thereby producing a treated cloth for softness evaluation. A panel of three judges tested the treated cloth by touching it with their hands and rated the softness in comparison with the untreated cloth according to the following criteria.

The results, which are based on the total number of points in the scores for the three panelists, are indicated according to the evaluation criteria defined below in terms of the point totals.

<Score>
3 points: Very pleasant to the touch compared with untreated cloth.
2 points: Pleasant to the touch compared with untreated cloth.
1 point: Same degree of pleasantness to the touch as for untreated cloth.
0 points: Unpleasant to the touch compared with untreated cloth.

<Evaluation Criteria>
◎: Total of 7 points or more
○: Total of 5 to 6 points
Δ: Total of 3 to 4 points
x: Total of 2 points or less 2. Water Absorbency Test liquors were prepared by adding deionized water to the emulsion composition and diluting it to a solids content of 2%. A polyester/cotton broadcloth (65%/35%, from Tanigashira Shoten) was dipped for 10 seconds in the test liquor, following which a roller was used to squeeze the cloth to a percent expression of 100%, and the cloth was dried for 2 minutes at 150° C. A single drop (25 μL) of tap water was then deposited on the treated cloth with a dropping pipette, and the time in seconds until the drop is completely absorbed by the cloth was measured (pre-wash water absorbency).

In addition, a treated cloth prepared in the same way was laundered once with a washing machine by a procedure in accordance with JIS L0217 103. After laundering, a water absorbency test was carried out by the above-described method (post-wash water absorbency).

3. Durability to Laundering

Test liquors were prepared by adding deionized water to the emulsion composition and diluting it to a solids content of 2%. A polyester/cotton broadcloth (65%/35%, from Tanigashira Shoten) was dipped for 10 seconds in the test liquor, following which a roller was used to squeeze the cloth to a percent expression of 100%, and the cloth was dried for 2 minutes at 150° C. This treated cloth was subsequently laundered once with a washing machine by a procedure in accordance with JIS L0217 103. The amount of silicone remaining on the fiber surfaces after a single wash was measured with a fluorescence x-ray spectrometer (Rigaku Corporation). The residual ratio (%) compared with when laundering is not carried out was calculated.

TABLE 1

| Formulation (pbw) | | Example 1 | Example 2 | Example 3 | Example 4 |
|---|---|---|---|---|---|
| (A) | (A-1) | 100.00 | | | 100.00 |
| | (A-2) | | 100.00 | 100.00 | |
| | (A-3) | | | | |
| (B) | (B-1) | | | | 51.65 |
| | (B-2) | 48.48 | 29.12 | 19.41 | |
| | (B-3) | | | | |
| (C) | (C-1) | 24.77 | | 19.89 | 25.34 |
| | (C-2) | | 21.51 | | |
| (D) | (D-1) | 8.19 | 3.29 | 1.62 | 8.17 |
| | (D-2) | | | | |
| (E) | (E) | 321.74 | 291.71 | 258.66 | 328.48 |
| Softness | | ◎ | ◎ | ◎ | ◎ |
| Pre-wash water absorbency (s) | | 12 | 11 | 24 | 7 |
| Post-wash water absorbency (s) | | 7 | 13 | 13 | 6 |
| Durability to laundering (residual ratio, %) | | 61 | 64 | 66 | 58 |

TABLE 2

| Formulation (pbw) | | Example 5 | Example 6 | Example 7 | Example 8 |
|---|---|---|---|---|---|
| (A) | (A-1) | 100.00 | 100.00 | | |
| | (A-2) | | | 100.00 | |
| | (A-3) | | | | 100.00 |
| (B) | (B-1) | 38.74 | 51.66 | 20.63 | 77.29 |
| | (B-2) | | | | |
| | (B-3) | | | | |
| (C) | (C-1) | | | | |
| | (C-2) | 23.13 | 25.27 | 20.11 | 29.53 |
| (D) | (D-1) | 8.17 | 3.08 | 3.26 | 4.57 |
| | (D-2) | | | | |
| (E) | (E) | 300.66 | 328.59 | 261.38 | 384.04 |
| Softness | | ◎ | ◎ | ◎ | ◎ |
| Pre-wash water absorbency (s) | | 7 | 17 | 14 | 5 |
| Post-wash water absorbency (s) | | 9 | 12 | 16 | 5 |
| Durability to laundering (residual ratio, %) | | 58 | 53 | 57 | 51 |

TABLE 3

| Formulation (pbw) | | Example 9 | Example 10 | Example 11 | Example 12 |
|---|---|---|---|---|---|
| (A) | (A-1) | 100.00 | 100.00 | | 100.00 |
| | (A-2) | | | 100.00 | |
| | (A-3) | | | | |
| (B) | (B-1) | | 43.59 | 20.66 | 51.60 |
| | (B-2) | | | | |
| | (B-3) | 24.36 | | | |
| (C) | (C-1) | | | | |
| | (C-2) | 20.71 | 21.32 | 20.17 | 25.25 |
| (D) | (D-1) | 3.06 | | | 3.08 |
| | (D-2) | | 2.32 | 3.29 | |
| (E) | (E) | 269.52 | 276.53 | 262.22 | 328.46 |
| (F) | (F-1) | | | | 16.31 |
| | (F-2) | | | | |
| Softness | | ◎ | ◎ | ◎ | ◎ |
| Pre-wash water absorbency (s) | | 21 | 15 | 20 | 19 |
| Post-wash water absorbency (s) | | 19 | 11 | 15 | 13 |
| Durability to laundering (residual ratio, %) | | 60 | 54 | 63 | 55 |

TABLE 4

| Formulation (pbw) | | Example 13 | Example 14 |
|---|---|---|---|
| (A) | (A-1) | | |
| | (A-2) | 100.00 | 100.00 |
| | (A-3) | | |
| (B) | (B-1) | 20.68 | 20.68 |
| | (B-2) | | |
| | (B-3) | | |
| (C) | (C-1) | | |
| | (C-2) | 20.12 | 20.12 |

TABLE 4-continued

| Formulation (pbw) | | Example 13 | Example 14 |
|---|---|---|---|
| (D) | (D-1) | 1.24 | 1.24 |
| | (D-2) | | |
| (E) | (E) | 261.48 | 261.48 |
| (F) | (F-1) | 24.20 | |
| | (F-2) | | 24.20 |
| Softness | | ◎ | ◎ |
| Pre-wash water absorbency (s) | | 10 | 20 |
| Post-wash water absorbency (s) | | 18 | 13 |
| Durability to laundering (residual ratio, %) | | 68 | 65 |

TABLE 5

| Formulation (pbw) | | Comparative Example 1 | Comparative Example 2 | Comparative Example 3 | Comparative Example 4 | Comparative Example 5 |
|---|---|---|---|---|---|---|
| (A) | (A-1) | 100.00 | | 100.00 | 100.00 | 100.00 |
| | (A-2) | | | | | |
| | (A-3) | | | | | |
| (B) | (B-1) | | 100.00 | | 3.00 | 600.00 |
| | (B-2) | | | | | |
| | (B-3) | | | | | |
| (C) | (C-1) | | | | | |
| | (C-2) | 20.00 | 20.00 | 20.00 | 20.00 | 20.00 |
| (D) | (D-1) | 2.00 | 2.00 | 2.00 | 2.00 | 2.00 |
| | (D-2) | | | | | |

TABLE 5-continued

| Formulation (pbw) | | Comparative Example 1 | Comparative Example 2 | Comparative Example 3 | Comparative Example 4 | Comparative Example 5 |
|---|---|---|---|---|---|---|
| (E) | (E) | 300.00 | 300.00 | 300.00 | 300.00 | 500.00 |
| (F) | (F-1) | | | 20.00 | | |
| | (F-2) | | | | | |
| Softness | | ◎ | Δ | ◎ | ◎ | ○ |
| Pre-wash water absorbency (s) | | 68 | 15 | 35 | 48 | 45 |
| Post-wash water absorbency (s) | | 241 | 14 | 84 | 75 | 78 |
| Durability to laundering (residual ratio, %) | | 81 | — | 43 | 50 | 58 |

INDUSTRIAL APPLICABILITY

The amino-modified silicone emulsion compositions of the invention are able to impart excellent softness and water absorbency to fiber surfaces. Moreover, textile treatment agents that use the silicone emulsion compositions of the invention also have a good durability, enabling fiber surfaces after laundering to maintain a high water absorbency.

The invention claimed is:

1. A silicone emulsion composition comprising:

(A) 100 parts by weight of an amino-modified silicone of the following average empirical formula (1)

(1)

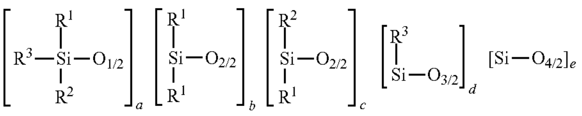

wherein each $R^1$ is independently an unsubstituted monovalent hydrocarbon group of 1 to 20 carbon atoms; each $R^2$ is independently a group of general formula (2)

(2)

$$-R^4-(NH-R^5)_f-NH_2$$

wherein $R^4$ and $R^5$ are each independently a divalent organic group of 1 to 6 carbon atoms, and f is 0 or 1; each $R^3$ is independently a group selected from $R^1$, $R^2$, —OH, —$OCH_3$ or —$OC_2H_5$; and the subscripts a, b, c, d and e are numbers which satisfy the conditions 2≤a≤10, 5≤b≤800, 0≤c≤50, 0≤d≤5 and 0≤e≤5, with the proviso that if c=0, at least one occurrence of $R^3$ is $R^2$, which has a viscosity at 25° C. of from 5 to 50,000 mPa·s and an amino equivalent weight of from 300 to 20,000 g/mol;

(B) from 10 to 200 parts by weight of a polyoxyalkylene group-containing epoxy compound of formula (2-1) or (2-2) below (2-1)

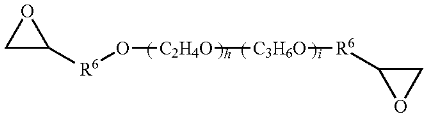

-continued (2-2)

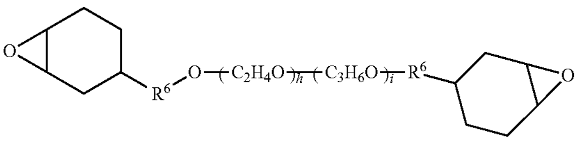

wherein each $R^6$ is independently a divalent organic group, h is a number from 0 to 100, i is a number from 0 to 100, and h+i is a number from 1 to 100;

(C) from 1 to 70 parts by weight of a surfactant;

(D) from 0.3 to 15 parts by weight of an organic acid; and (E) from 50 to 5,000 parts by weight of water.

2. The silicone emulsion composition of claim 1, wherein component (A) is an amino-modified silicone of the following average empirical formula (1-2)

(1-2)

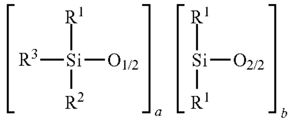

wherein each $R^1$ is independently an unsubstituted monovalent hydrocarbon group of 1 to 20 carbon atoms; each $R^2$ is independently a group of general formula (2)

(2)

$$-R^4-(NH-R^5)_f-NH_2$$

wherein $R^4$ and $R^5$ are each independently a divalent organic group of 1 to 6 carbon atoms, and f is 0 or 1; each $R^3$ is independently a group selected from $R^1$, $R^2$, —OH, —$OCH_3$ or —$OC_2H_5$; and the subscripts a and b are numbers which satisfy the conditions 2≤a≤10 and 5≤b≤800, which has a viscosity at 25° C. of from 5 to 50,000 mPa·s and an amino equivalent weight of from 300 to 20,000 g/mol.

3. The silicone emulsion composition of claim 1, wherein component (B) is a polyoxyalkylene group-containing epoxy compound of formula (2-1).

4. The silicone emulsion composition of claim 1, further comprising:

(F) from 1 to 50 parts by weight of a polyether-modified silicone of formula (4) below (4)

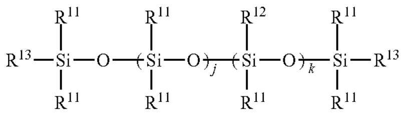

wherein each $R^{11}$ is independently a phenyl group, an alkyl group of 1 to 6 carbon atoms, an alkoxy group of 1 to 6 carbon atoms or a hydroxyl group; each $R^{12}$ is independently a monovalent organic group of the formula $—C_l H_{2l}O(C_2H_4O)_m(C_3H_6O)_nR^{14}$; each $R^{13}$ is independently $R^{11}$ or $R^{12}$; $R^{14}$ is a hydrogen atom, an alkyl group of 1 to 6 carbon atoms or an acetyl group; j is a number from 0 to 100, k is a number from 0 to 100, j+k is a number from 0 to 200, 1 is a number from 2 to 5, m is a number from 1 to 40 and n is a number from 0 to 40, with the proviso that if k=0, at least one occurrence of $R^{13}$ is $R^{12}$.

5. The silicone emulsion composition of claim 1 which contains no organic solvent.

6. A textile treatment agent comprising the silicone emulsion composition of claim 1.

7. A textile treatment agent comprising the silicone emulsion composition of claim 1, wherein, the textile is selected cotton, silk, linen and synthetic fibers.

8. The silicone emulsion composition of claim 1, wherein component (A) is selected from following formulas:

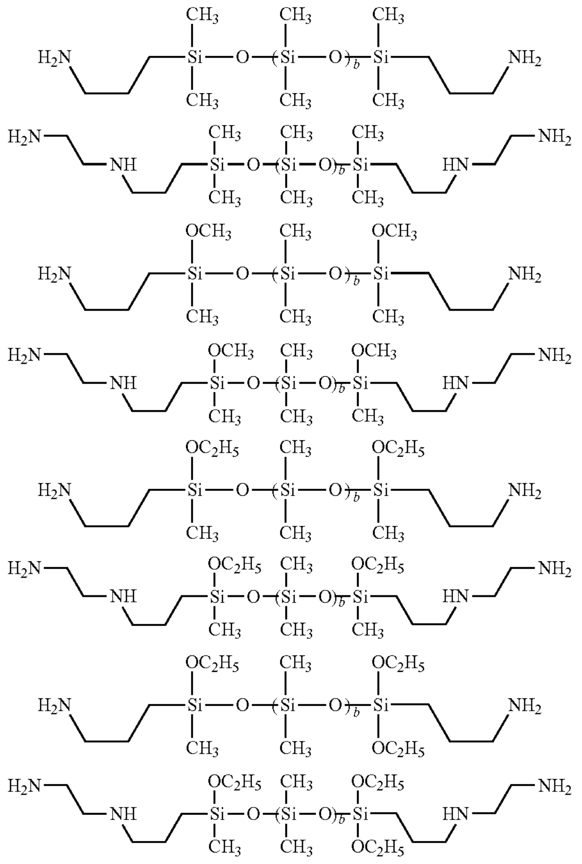

-continued

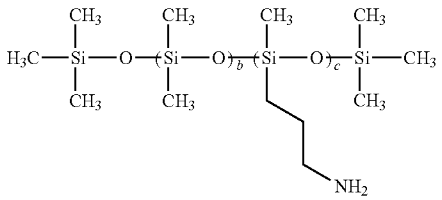

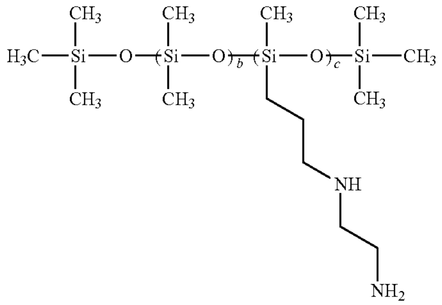

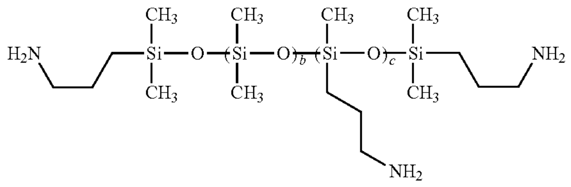

wherein b and c are the same as above.

9. The silicone emulsion composition of claim 1, wherein component (A) is selected from following formulas:

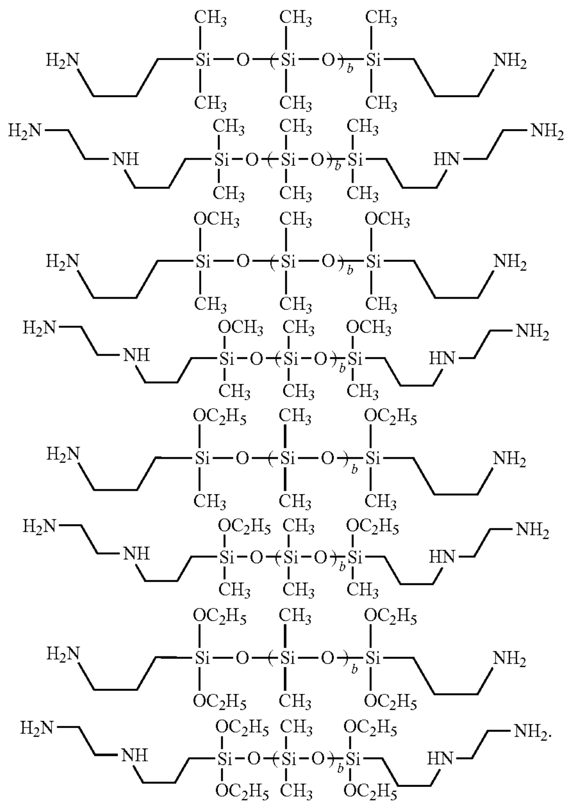

10. A silicone emulsion composition consisting of:

(A) 100 parts by weight of an amino-modified silicone of the following average empirical formula (1)

(1)

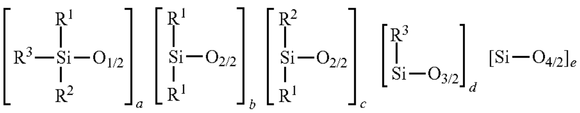

wherein each $R^1$ is independently an unsubstituted monovalent hydrocarbon group of 1 to 20 carbon atoms; each $R^2$ is independently a group of general formula (2)

(2)

$$—R^4—(NH—R^5)_f—NH_2$$

wherein $R^4$ and $R^5$ are each independently a divalent organic group of 1 to 6 carbon atoms, and f is 0 or 1; each $R^3$ is independently a group selected from $R^1$, $R^2$,—OH,—$OCH_3$ or —$OC_2H_5$;

and the subscripts a, b, c, d and e are numbers which satisfy the conditions $2 \leq a \leq 10$, $5 \leq b \leq 800$, $0 \leq c \leq 50$, $0 \leq d \leq 5$ and $0 \leq e \leq 5$, with the proviso that if c=0, at least one occurrence of $R^3$ is $R^2$, which has a viscosity at 25° C. of from 5 to 50,000 mPa·s and an amino equivalent weight of from 300 to 20,000 g/mol;

(B) from 10 to 200 parts by weight of a polyoxyalkylene group-containing epoxy compound of formula (2-1) or (2-2) below (2-1)

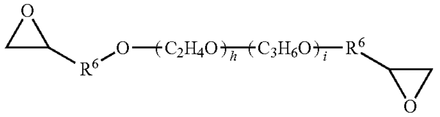

(2-2)

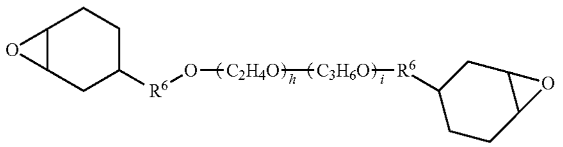

wherein each $R^6$ is independently a divalent organic group, h is a number from 0 to 100, i is a number from 0 to 100, and h+i is a number from 1 to 100;

(C) from 1 to 70 parts by weight of a surfactant;

(D) from 0.3 to 15 parts by weight of an organic acid; and (E) from 50 to 5,000 parts by weight of water, and optionally further consisting of one or more of:

(F) from 1 to 50 parts by weight of a polyether-modified silicone of formula (4) below (4)

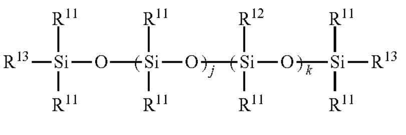

wherein each $R^{11}$ is independently a phenyl group, an alkyl group of 1 to 6 carbon atoms, an alkoxy group of 1 to 6 carbon atoms or a hydroxyl group; each $R^{12}$ is independently a monovalent organic group of the formula —$C_1$ $H_{2l}(C_2H_4O\ )_m(C_3H_6O)_nR^{14}$; each $R^{13}$ is independently $R^{11}$ or $R^{12}$; $R^{14}$ is a hydrogen atom, an alkyl group of 1 to 6 carbon atoms or an acetyl group; j is a number from 0 to 100, k is a number from 0 to 100, j+k is a number from 0 to 200, 1 is a number from 2 to 5, m is a number from 1 to 40 and n is a number from 0 to 40, with the proviso that if k=0, at least one occurrence of $R^{13}$ is $R^{12}$, thickeners, pigments, dyes, penetrants, antistatic agents, antifoaming agents, flame retardants, antimicrobial agents, preservatives, water repellents, crosslinking agents, adhesion promoters, other silicone oils, silicone resins, acrylic resins and urethane resins.

11. The silicone emulsion composition of claim 10, wherein component (A) is an amino-modified silicone of the following average empirical formula (1-2)

(1-2)

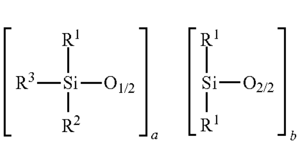

wherein each $R^1$ is independently an unsubstituted monovalent hydrocarbon group of 1 to 20 carbon atoms; each $R^2$ is independently a group of general formula (2)

(2)

$$—R^4—(NH—R^5)_f—NH_2$$

wherein $R^4$ and $R^5$ are each independently a divalent organic group of 1 to 6 carbon atoms, and f is 0 or 1; each $R^3$ is independently a group selected from $R^1$, $R^{b\ 2}$, —OH, —$OCH_3$ or —$OCH_5$; and the subscripts a and b are numbers which satisfy the conditions $2 \leq a \leq 10$ and $5 \leq b \leq 800$, which has a viscosity at 25° C. of from 5 to 50,000 mPa·s and an amino equivalent weight of from 300 to 20,000 g/mol.

12. The silicone emulsion composition of claim 10, wherein component (B) is a polyoxyalkylene group-containing epoxy compound of formula (2-1).

13. The silicone emulsion composition of claim 10, further comprising:

(F) from 1 to 50 parts by weight of a polyether-modified silicone of formula (4) below (4)

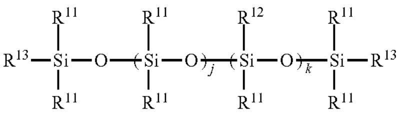

wherein each $R^{11}$ is independently a phenyl group, an alkyl group of 1 to 6 carbon atoms, an alkoxy group of 1 to 6 carbon atoms or a hydroxyl group; each $R^{12}$ is independently a monovalent organic group of the formula —$C_1$ $H_{2l}O\ (C_2H_4O\ )_m(C_3H_{60})_nR^{14}$; each $R^{13}$ is independently $R^{11}$ or $R^{12}$; $R^{14}$ is a hydrogen atom, an alkyl group of 1 to 6 carbon atoms or an acetyl group; j is a number from 0 to 100, k is a number from 0 to 100, j+k is a number from 0 to 200, 1 is a number from 2 to 5, m is a number from 1 to 40 and n is a number from 0 to 40, with the proviso that if k=0, at least one occurrence of $R^{13}$ is $R^{12}$.

14. The silicone emulsion composition of claim 10 which contains no organic solvent.

15. A textile treatment agent comprising the silicone emulsion composition of claim 10.

16. A textile treatment agent comprising the silicone emulsion composition of claim 10, wherein, the textile is selected cotton, silk, linen and synthetic fibers.

17. The silicone emulsion composition of claim 10, wherein component (A) is selected from following formulas:

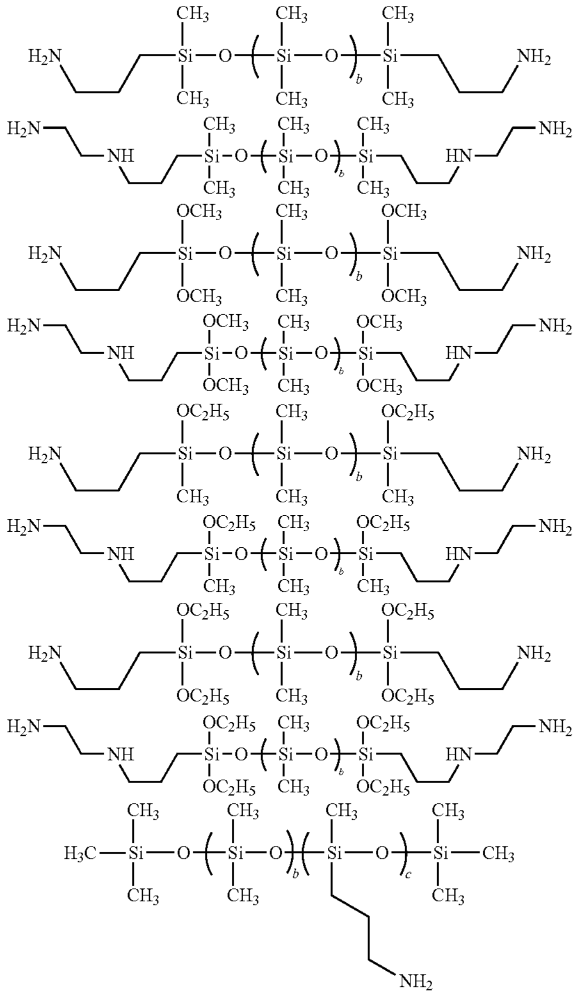

-continued

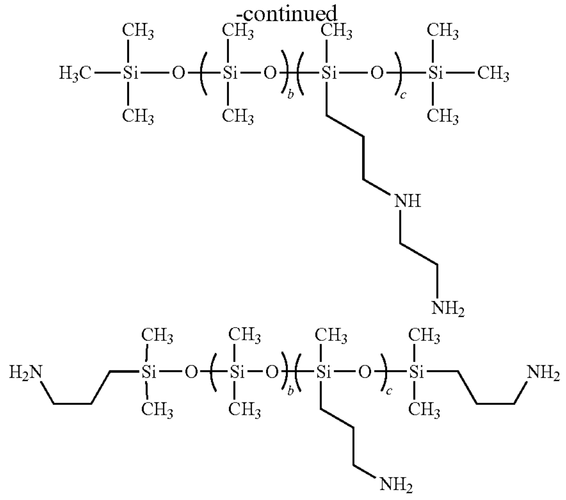

wherein b and c are the same as above.

18. The silicone emulsion composition of claim 10, wherein component (A) is selected from following formulas:

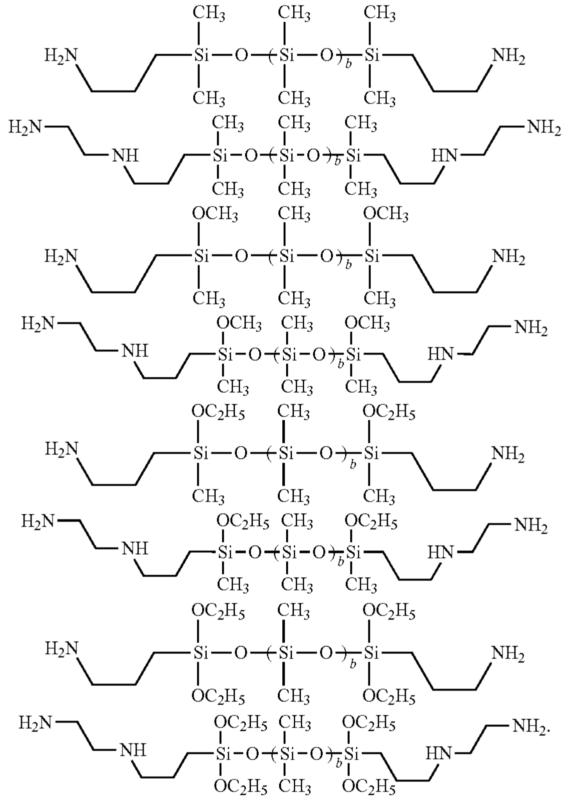

* * * * *